United States Patent [19]

Lentz

[11] Patent Number: 5,649,173

[45] Date of Patent: Jul. 15, 1997

[54] HARDWARE ARCHITECTURE FOR IMAGE GENERATION AND MANIPULATION

[75] Inventor: Derek Lentz, Los Gatos, Calif.

[73] Assignee: Seiko Epson Corporation, Tokyo, Japan

[21] Appl. No.: 413,983

[22] Filed: Mar. 6, 1995

[51] Int. Cl.$^6$ ................................................. G06F 12/00
[52] U.S. Cl. ........................ 395/513; 395/501; 395/522
[58] Field of Search ................................ 395/119, 122, 395/125–127, 129, 130, 162–166, 501, 507, 509, 513, 522, 515; 345/112, 113, 118, 132, 133, 185, 136–139, 189–191, 213

[56] References Cited

U.S. PATENT DOCUMENTS

| | | | |
|---|---|---|---|
| 4,343,037 | 8/1982 | Bolton | 395/130 |
| 4,545,068 | 10/1985 | Tabata et al. | 395/163 |
| 4,586,038 | 4/1986 | Sims et al. | 395/130 |
| 4,727,365 | 2/1988 | Bunker et al. | 345/139 |
| 4,729,098 | 3/1988 | Cline et al. | 364/413.08 |
| 4,879,668 | 11/1989 | Cline et al. | 395/124 |
| 4,888,713 | 12/1989 | Falk | 395/125 |
| 4,905,164 | 2/1990 | Chandler et al. | 395/131 |
| 5,012,163 | 4/1991 | Alcorn et al. | 315/383 |
| 5,097,427 | 3/1992 | Lathrop et al. | 395/130 |
| 5,146,557 | 9/1992 | Yamrom et al. | 395/161 |
| 5,155,822 | 10/1992 | Doyle et al. | 395/166 |
| 5,175,806 | 12/1992 | Muskovitz et al. | 395/125 |
| 5,179,638 | 1/1993 | Dawson et al. | 395/125 |
| 5,187,754 | 2/1993 | Currin et al. | 382/284 |
| 5,191,642 | 3/1993 | Quick et al. | 395/127 |
| 5,222,204 | 6/1993 | Swanson | 395/127 |
| 5,222,205 | 6/1993 | Larson et al. | 395/130 |
| 5,224,208 | 6/1993 | Miller, Jr. et al. | 395/125 |
| 5,230,039 | 7/1993 | Grossman et al. | 395/130 |
| 5,274,760 | 12/1993 | Schneider | 395/162 |
| 5,278,949 | 1/1994 | Thayer | 395/126 |

(List continued on next page.)

FOREIGN PATENT DOCUMENTS

| | | | |
|---|---|---|---|
| 447 145 A2 | 9/1992 | European Pat. Off. | G06F 13/28 |
| 590 765 A3 | 4/1994 | European Pat. Off. | G06F 15/72 |
| 590 968 A3 | 4/1994 | European Pat. Off. | G06F 15/72 |
| WO94/10642 | 5/1994 | WIPO | G06F 15/62 |

*Primary Examiner*—Kee M. Tung
*Attorney, Agent, or Firm*—Eric B. Janofsky

[57] ABSTRACT

An image generation and manipulation system includes an integrated circuit dedicated exclusively to direct manipulation of pixel values in a frame buffer. This "rendering processor" draws primitives, performs pixel operations, generates the system display timing and controls the frame buffer, all in response to data and commands delivered to the rendering processor by the host CPU. The degree of pixel processing performed by the rendering processor (and not other hardware or software components) can vary with desired system capability. At a minimum, the rendering processor is capable of drawing pixels into the frame buffer in response to commands received from the host CPU, an illumination processor or other high-level graphics processor. The rendering processor preferably also performs interpolation operations to refine raw pixel values into values meaningful to the display hardware. In addition, the rendering processor can be provided with the ability to perform filtering operations, such as antialiasing and dithering; alpha blending; Z-buffering; clipping to a window or other boundary; double buffering of the image; and texture processing. The rendering processor may include a series of self-actuating registers that are each associated with a particular command. By addressing and writing data into any of these registers, the host implicitly specifies execution of the command associated with the particular register. The rendering processor may also provide a "slave" mode wherein the drawing hardware of the rendering processor is synchronously controlled by an external processor so that the rendering processor single-steps through the scan-conversion process while the external hardware performs related computations.

19 Claims, 4 Drawing Sheets

U.S. PATENT DOCUMENTS

| | | | |
|---|---|---|---|
| 5,280,568 | 1/1994 | Obata | 395/121 |
| 5,287,438 | 2/1994 | Kelleher | 395/132 |
| 5,293,480 | 3/1994 | Miller et al. | 395/163 |
| 5,295,199 | 3/1994 | Shino | 395/125 |
| 5,299,309 | 3/1994 | Kuo et al. | 395/163 |
| 5,307,450 | 4/1994 | Grossman | 395/130 |
| 5,333,245 | 7/1994 | Vecchione | 395/130 |
| 5,345,541 | 9/1994 | Kelley et al. | 395/126 |
| 5,361,386 | 11/1994 | Watkins et al. | 395/130 |
| 5,367,615 | 11/1994 | Economy et al. | 395/129 |
| 5,369,736 | 11/1994 | Kato et al. | 395/125 |
| 5,369,744 | 11/1994 | Fukushima et al. | 395/163 |

HARDWARE ARCHITECTURE FOR IMAGE GENERATION AND MANIPULATION

FIELD OF THE INVENTION

This invention relates to digital image generation and manipulation, and in particular to a hardware architecture that facilitates high-speed manipulation and assembly of digitally represented images and graphics.

BACKGROUND OF THE INVENTION

The widespread availability of powerful computer equipment has drastically expanded the amount of image detail and spatial information that can be represented in digital form. Whereas in older systems images were stored as "bitmap" rasters of bilevel values, modern image generation and manipulation systems accommodate multilevel "pixmaps" in which each image picture element, or "pixel," is represented by one or more bytes that can specify entries from huge color palettes, luminance values, etc.

In sophisticated systems, digitally represented images— which may also contain user-defined graphical components, such as lines, polygons and circles—can originate from an optical scanner (in the case, primarily, of images) or a user-supplied geometric specification (in the case of graphic components). Using "raster image processor" hardware or software, the system "scan-converts" the incoming information into an imagewise array, or raster, of pixels having appropriate color values and which collectively represent the image. The two-dimensional raster geometry corresponds to the displayable width and height of the image, while the number of bits associated with each pixel in the array is called the depth. The raster is stored in a computer memory partition called the "frame buffer," the contents of which determine the instantaneous displayed image on an output device.

Ordinarily, the user obtains access to the frame buffer through high-level application software (such as a design program) that manipulates the individual pixel values in response to user commands. For example, image generation and manipulation software available even for relatively modest computer systems enables users to translate, rotate and linearly scale rasterized images. These programs "clip" graphic and image components to fit within the rectangular region defined by the pixmap; portions falling outside that region (e.g., as a result of user manipulation) are not rendered (although they may be stored in an overflow buffer). They may also provide for various "filtering" operations, which mathematically process the pixel values to obtain a desired effect (e.g., to smooth out the "staircasing" effects that can result from scan conversion).

The manner in which image-rendering tasks are shared among software modules (executed by the main central processing unit, or CPU) and specialized hardware components dedicated exclusively to image rendering depends on the required degree of performance. The most computationally demanding tasks involve manipulation of image components in a manner that reflects three-dimensional relationships. For example, if the design program permits a user to rotate a sphere in three dimensions, the program must maintain computational "awareness" of the entire surface content of the sphere even though only a portion of that content is visually presented at any one time. Perspective issues also arise, since three-dimensional manipulation affects not only the absolute content that is presented to the user but its rendered perspective as well; these are quite visible for edged graphic objects, such as cubes. Manipulation of the content so that the visible image portions make sense given the user's viewpoint requires application of mathematically intensive geometric transformations to each pixel of such objects. In systems requiring maximum performance, these operations are carried out by high-speed dedicated hardware components that manipulate the frame buffer directly, thereby relieving the main CPU of the processing burden and reducing traffic on the system bus; in lower-end systems, which stress cost-effectiveness over time performance, the computations are performed by the main CPU in accordance with appropriate software instructions, and the CPU manipulates the contents of the frame buffer.

The most advanced design systems give the user control over the surface appearance of three-dimensional objects, altering the values of pixels corresponding to object surfaces so they conform to user selections. For example, the direction and quality of illumination, as well as the character of illuminated surfaces, determine the visual appearance of an object; these parameters can be captured and computationally applied to rendered objects using an illumination model. Design systems can also allow users to add visual detail to otherwise simple surfaces (or to replace existing surface detail with new designs or images) using a technique known as "texture mapping." In this context the term "texture" broadly connotes any form of surface detail, such as an image, rather than simple surface patterns. Employing this technique, the user specifies a digitally sampled "picture," represented as a pixmap and known as a "texture map" or "texture" to be applied to the designated surface(s) of a three-dimensionally rendered object. The imaging system applies the texture using successive spatial transformations: it first applies the texture to a mathematical representation of the object as it would appear in three-dimensional space, and then projects the visible surfaces of the object onto a pixmap representing the output screen. Once again, these surface-manipulation operations ordinarily are carried out by dedicated hardware components or by the main CPU in accordance with software instructions, This dichotomy between hardware and software solutions to execution of the various image generation and manipulation functions contributes to a wide gulf between expensive high-end systems featuring extremely fast response times and inexpensive low-end systems that perform substantially more slowly.

DESCRIPTION OF THE INVENTION

SUMMARY OF THE INVENTION

The present invention provides a hardware architecture that bridges the gap between systems in which image-rendering functions are performed primarily by hardware and those that rely primarily on software implementation. The architecture, or system topology of the invention utilizes components that may be manufactured at relatively low cost, and which interact with one another to minimize image-related bus transactions, as well as to and relieve the main (or "host") CPU of the most burdensome computations relating to image generation and manipulation. In essence, the invention provides hardware support to a system implemented primarily as software modules. Moreover, the invention provides an extensible hardware platform to which additional capabilities can be added, thereby affording the system designer the ability to select an optimal mix of software and hardware functionality.

In one aspect, the invention includes an integrated circuit dedicated exclusively to direct manipulation of pixel values in the frame buffer. This "rendering processor" draws primitives (i.e., performs scan conversion of graphics primitives), performs pixel operations, generates the system display timing and controls the frame buffer, all in response to data and commands delivered to the rendering processor by the host CPU. Preferably, the repertoire of the rendering processor includes scan conversion of graphics primitives, thereby relieving the host CPU of this task and significantly reducing bus bandwidth requirements. In accordance with this aspect of the invention, the host CPU (or other external processing element) performs the basic computations relating to lighting and texture mapping. These computations result in raw pixel values, which the rendering processor refines into final values that it draws into the frame buffer. Processing components such as the host CPU obtain access to the frame buffer only through the rendering processor.

The degree of pixel processing performed by the rendering processor (and not other hardware or software components) can vary with desired system capability. At a minimum, the rendering processor is capable of drawing pixels into the frame buffer in response to commands received from the host CPU, a geometry processor or other high-level graphics processor; this entails computing actual pixel addresses in the frame buffer from X and Y values or geometric specifications provided by the CPU. The rendering processor preferably also performs interpolation operations to determine individual pixel values from end-point coordinates or their equivalent. In addition, the rendering processor can be provided with the ability to perform special processing algorithms and mathematical operations, such as antialiasing and dithering; alpha blending; Z-buffering; fog computations (which add white to a pixel image value to simulate fog and thereby provide depth cueing); clipping to a window or other boundary; double buffering of the image (i.e., generating an image while keeping in memory the currently displayed, previously generated image); and texture-map processing. Once again, the functionality with which the rendering processor is provided depends on the relative benefit (in terms of economy and time performance) of withdrawing particular functions from software or other hardware; ideally, the choice will maximize throughput over the main system bus and minimize latencies.

In one variation of this arrangement, the system includes a separate processor that implements one or more illumination models to shade displayed image or graphic objects in accordance with user-specified lighting parameters. This "lighter" or "geometry" processor communicates directly with the rendering processor; it does not access the frame buffer directly.

In another aspect of the invention, the rendering processor includes a series of self-actuating registers that are each associated with a particular command. By addressing and writing data into any of these registers, the host implicitly specifies execution of the command associated with the particular register. In an especially preferred embodiment, the invention decomposes texture-mapping operations into a limited set of instructions associated with a corresponding number of registers located in the rendering processor.

In another aspect of the invention, the rendering processor of the present invention preferably provides a "slave" mode wherein the drawing hardware of the rendering processor is synchronously controlled by an external processor (e.g., the host CPU or the lighter processor), so that the rendering processor single-steps through the scan-conversion process while the external hardware performs related computations (e.g., for texture mapping). By synchronizing operation of the rendering processor with an external processor in this way, the invention provides an efficiency-optimized arrangement whereby the external processor performs one set of complex, computationally intensive rendering (e.g., texture mapping) computations, while the the rendering processor utilizes the output of these computations on a continuous, pipelined basis and provides another set of computations such as those associated with frame-buffer data.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENTS

Figure 1:
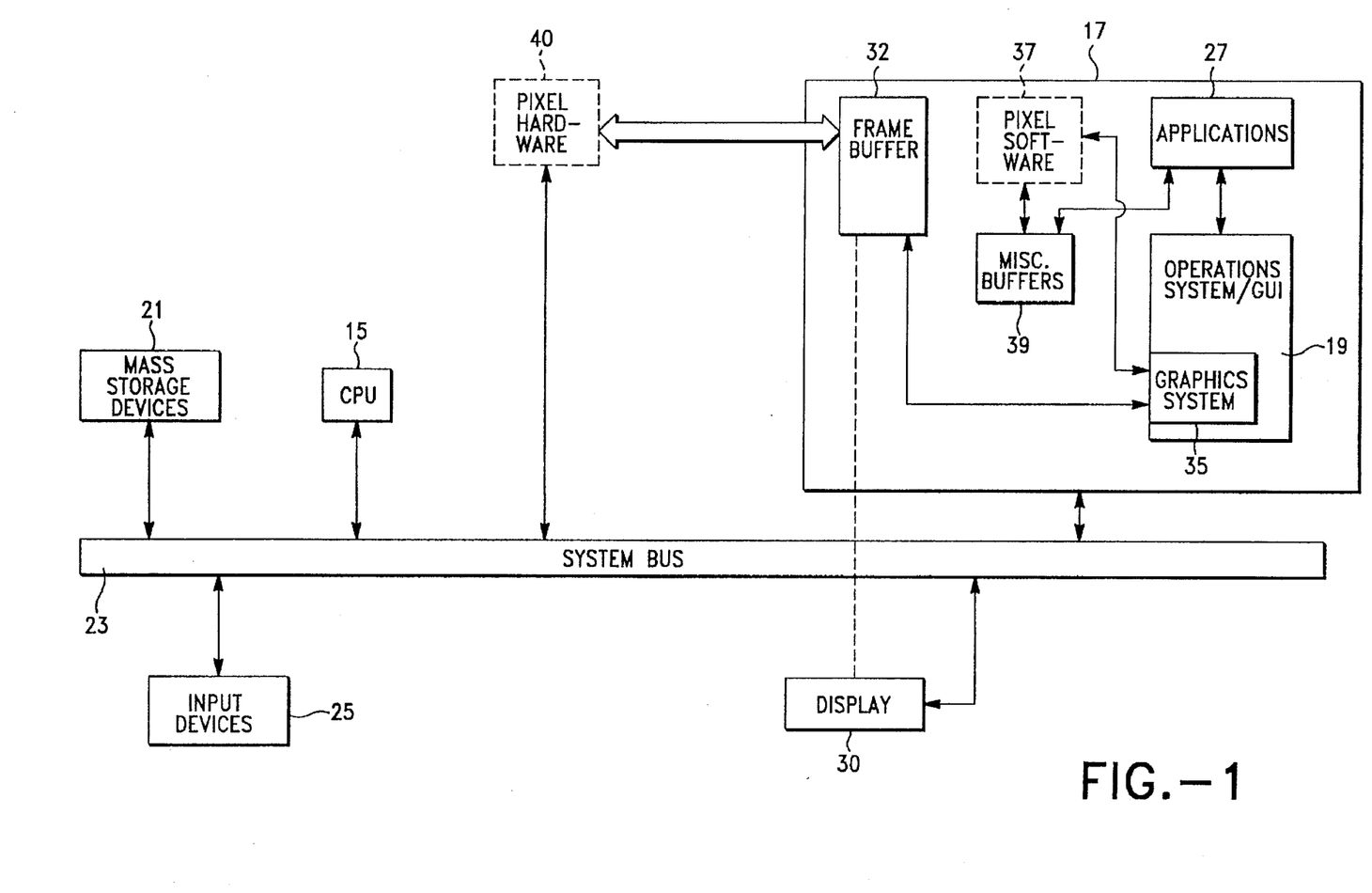
FIG. 1 schematically illustrates a representative computational environment for the present invention.

Refer first to FIG. 1, which illustrates a generalized hardware environment for graphic and image-rendering applications. The depicted computer system includes a host central-processing unit (CPU) 15, which performs operations on and interacts with a main system memory 17 and components thereof. System memory 17 typically includes volatile or random-access memory (RAM) for temporary storage of information, including portions of the computer's basic operating system and graphical user interface (denoted collectively by reference numeral 19). The system typically also includes read-only memory (ROM) for permanent storage of the computer's configuration and additional portions of the basic operating system, and at least one mass storage device 21, such as a hard disk and/or CD-ROM drive. All components of the system communicate over a bidirectional system bus 23.

The user ordinarily interacts with the system by means of one or more input devices 25 (e.g., a keyboard, mouse, an optical scanner that reads documents and digitizes their contents, etc.) as it runs one or more application programs 27, at least portions of which reside in system memory 17. As used herein, the term "application program" refers broadly to any body of functionality for processing information of interest to the user and presenting that information in a manner that involves graphics or image generation or manipulation operations, these terms being used interchangeably for simplicity of discussion. Output is presented on a display 30. The instantaneous, pixel-by-pixel appearance of display 30 is determined by the contents of a frame buffer 32, which is shown as a partition of main system memory 17 (although it may be implemented separately from memory 17).

The system includes a number of components dedicated to graphic or image-rendering operations. Operating system 19 includes a graphics subsystem 35 that executes basic pre-rendering functions, such as decomposing an input image (defined as geometric objects) into graphics primitives such as image points, lines and polygons (defined in terms of their vertices) and interpretation of encoded graphics instructions (e.g., PostScript™ commands); this functionality can also be shared with applications 27. A typical low-end system will also include software modules, representatively denoted at reference numeral 37, that implement more advanced image-generation functions. Software 37 ordinarily includes a raster-image processor (RIP) that performs scan conversion of primitives generated by graphics system 35 into actual pixel values and addresses, and a module for assigning pixel attributes such as color, transparency (so that overlapping objects properly occlude one another) and object connectivity; and may also include a module that performs geometric transformation of rendered objects as the user alters their orientation; modules for prefiltering and/or postfiltering; and modules for lighting computations and texture mapping. Software modules 17 can represent discrete, independently executable software entities, or functionality associated with applications 27, or some combination thereof. Ordinarily, modules 17 interact with a series of memory buffers 39 to implement functions such as double buffering, texture mapping, etc. All of the processing operations noted above are well-characterized in the art, and software implementing them is readily available. Some limited pixel hardware (e.g., VGA) is usually employed in current low-end systems.

In high-end systems, responsibility for virtually all graphics and image-rendering operations not performed by graphics system 35 is lodged in dedicated hardware, representatively denoted at reference numeral 40. This display-control hardware, which may consist of several discrete integrated-circuit processors, is operatively connected directly to frame buffer 32. Thus, read and write operations between hardware 40 and frame buffer 32 occur without involvement of bus 23. Hardware 40 may also have direct access to various of buffers 39.

Figure 2:
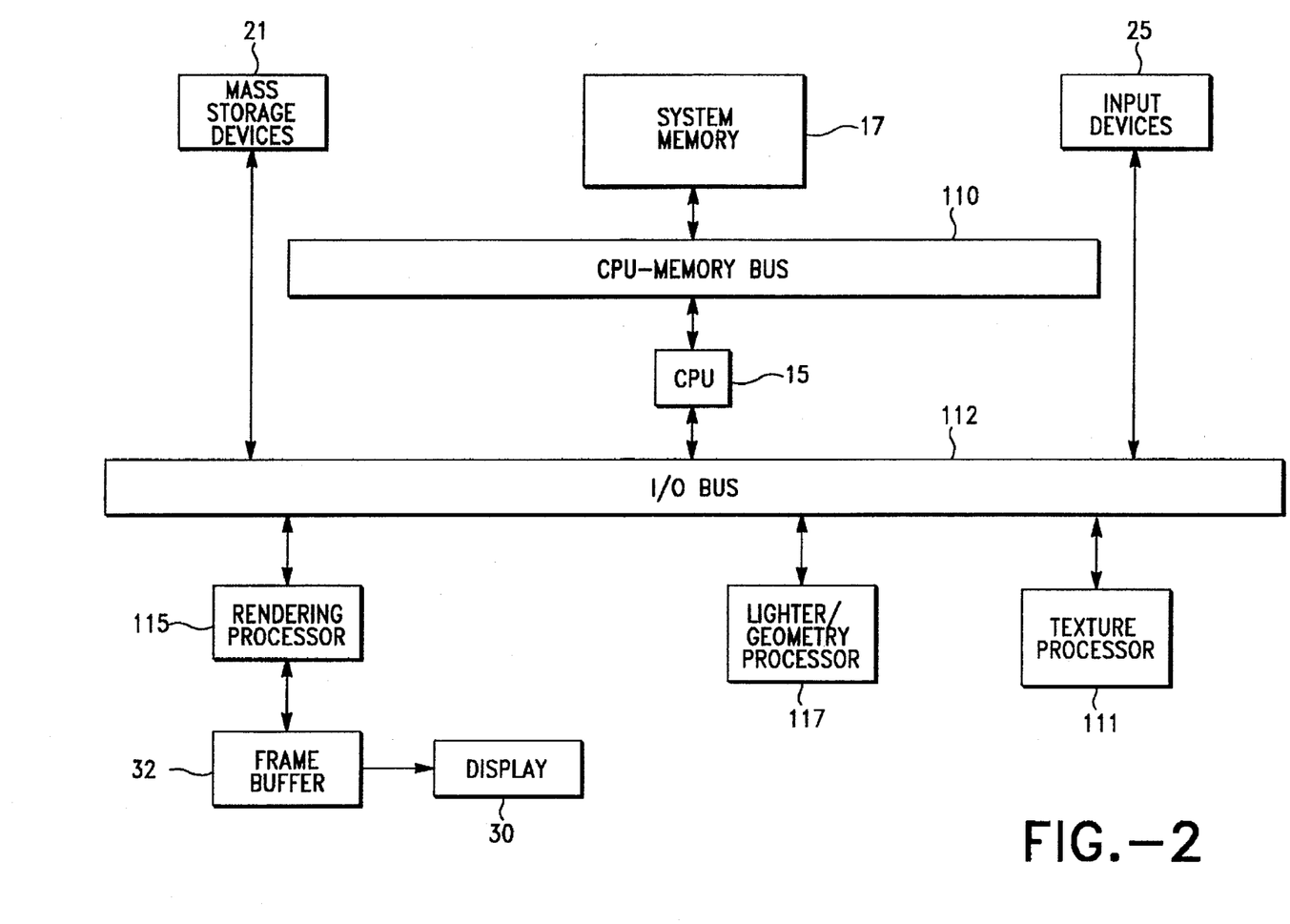
FIG. 2 schematically illustrates the components and operation of the topology of present invention.

The topology of the present invention, which facilitates optimal allocation of imaging and graphic functionality among software and hardware components for cost-effective two-dimensional and three-dimensional graphics rendering, is shown in FIG. 2. In this architecture, main system bus 23 is replaced with a pair of buses 110, 112 that carry more focused types of transactions. The CPU-Memory bus 110 retains many of the functions of system bus 23, coupling CPU 15 to system memory 17. I/O bus 112 couples CPU 15 to a dedicated rendering processor, the functions of which will be described in detail below, mass storage devices 21 and input devices 25. I/O bus 112 may also couple CPU 15 and rendering processor 115 to an optional lighter/geometry processor 117, which performs the mathematical operations associated with geometric transformations, lighting and, if desired, clipping; integrated circuits implementing the functions of processor 117 are well-characterized in the art, and are typically highly pipelined VLIW chips or digital signal processor ("DSP") chips configured for floating-point operations. (Alternatively, of course, these functions can be provided by CPU 15 in accordance with appropriate software modules 37, but at the cost of overall processing efficiency.) Finally, I/O bus 112 may couple CPU 15 and rendering processor 115 to a texture processor 111, which carries out texturing operations. If processors 117 and/or 111 are omitted, their functions are performed by rendering processor 115, by CPU 15 in accordance with instructions stored in memory 17, or some combination thereof. Frame buffer 32, although still implemented in RAM, has been withdrawn from the components of system memory 17 addressable by CPU 15; its contents are determined and manipulated solely by or through rendering processor 115. Once again, the discernible features presented on display 30 reflect the instantaneous contents of frame buffer 30.

The operation of texture processor 111 and its relationship to rendering processor 115 are best understood in the context of texture mapping. As indicated earlier, this operation is used to add visual detail to bounded graphic surface areas. The visual detail originates with one or more user-selected "texture maps," which are typically planar images residing in a buffer 39 (or in frame buffer 32); image generation and manipulation systems usually provide a plurality of selectable texture maps and allow the user to add more, any of which can be downloaded to a buffer 39 from a mass storage device 21 upon user selection.

Alternatively, processors 117, 111 can be incorporated in series connection with processor 115, or the functions of processors 117, 111 can be combined.

The pixels, or "texels" of a texture map are commonly defined as a u by v array, with each texel identified by a u,v coordinate. To apply the texels to a graphic surface representing a three-dimensional object (i.e., the projection of the object onto a plane normal to the viewer's line of sight), the texels are first mapped onto the object's three-dimensional surface as defined mathematically; then this surface is projected onto the output screen to form a primitive or image defined in x,y coordinates.

A single pixel on the output screen (i.e., in frame buffer 32) to which the texture map is applied may be derived from a plurality of texels, necessitating weighting and summing among texels. The number of texels corresponding to a particular pixel depends on the geometric relationship between the texture map and the three-dimensional object surface. In extreme cases, such as where a texture is mapped onto an oblique, receding ground plane, the process can become quite inefficient as extremely large numbers of texels must be weighted and summed just to texture a single distant ground-plane pixel. To overcome such problems, various prefiltering schemes have been devised. These typically involve representing the texture map as a multi-resolution data structure, and may be generated by successively bandlimiting and subsampling the original texture map to form a hierarchy of images at decreasing resolutions. The coarser texture maps are computationally less demanding to use since they are prefiltered, and texture processor 111 determines which texels in which texture maps to apply to a given surface point based on appropriate geometric considerations; the overall goal is to maximize processing efficiency with minimal sacrifice to final image resolution. Typically, an application program specifies the relative weights accorded these competing parameters.

One such prefiltering approach involves decomposing a color texture-map image into a pyramid memory organization called a "mip map"; the term mip is derived from the Latin phrase multum in parvo, meaning "many things in a small place." In this scheme, the different pyramid levels correspond to different resolutions of the original source image, and the number of levels can be extended by trilinear interpolation (blending) between levels; the final texel value is defined by u, v and d coordinates, where d corresponds to the depth of the interpolated pyramidal layer. The mathematic operations associated with the transformation, projection and interpolation routines may be implemented by the optional geometry processor 117 or texture processor 111. Rendering processor 115 computes the final filtered texel value and draws pixels in the appropriate x,y location of frame buffer 32, applying further filtering operations as appropriate. Thus, in the depicted topology, rendering processor 115 has exclusive access to frame buffer 32. Pre-rendering operations (clipping, lighting, many texture-mapping calculations and other geometric transformations) are performed by processors 117, 111 or can be assigned, if desired, to CPU 15; for convenience of presentation, the ensuing discussion presumes the availability of processors 117, 111.

The primary task performed by rendering processor is scan conversion of primitives using the parameters (x, y, z, r, g, b, α, F, T) associated with each pixel, where:

x, y=coordinate location in frame buffer of picture elements (pixels)

z="depth" of pixel relative to other objects (for occlusion relationships)

r, g, b=pixel color vaues in a red/blue/green color space

α=transparency or pixel-coverage value

F=fog value

T=texel value(s)

Typically, z-values are stored in a separate "Z-buffer" (i.e., one of the buffers 39) associated with each primitive to be rendered, and rendering processor 115 determines the z-values of individual pixels in the course of scan conversion based on values, associated with the object from which the primitive is derived, that indicates its depth relative to other objects. The final values assigned to an x,y pixel depend on the r,g,b value of the corresponding point on the primitive, its z-value, and any associated α and F values. In the case of texture mapping, each primitive will ordinarily have at most one associated texture map or one set of mip maps. To accommodate texturing, for each pixel rendering processor 115 typically reads r,g,b values from frame buffer 32, a z value from the Z-buffer, and one or more texel values T provided by texture processor 111, then combines these into a final pixel value through interpolation and blending. Rendering processor 115 also typically uses interpolated "source" r, g, b, z and F values.

Figure 3:
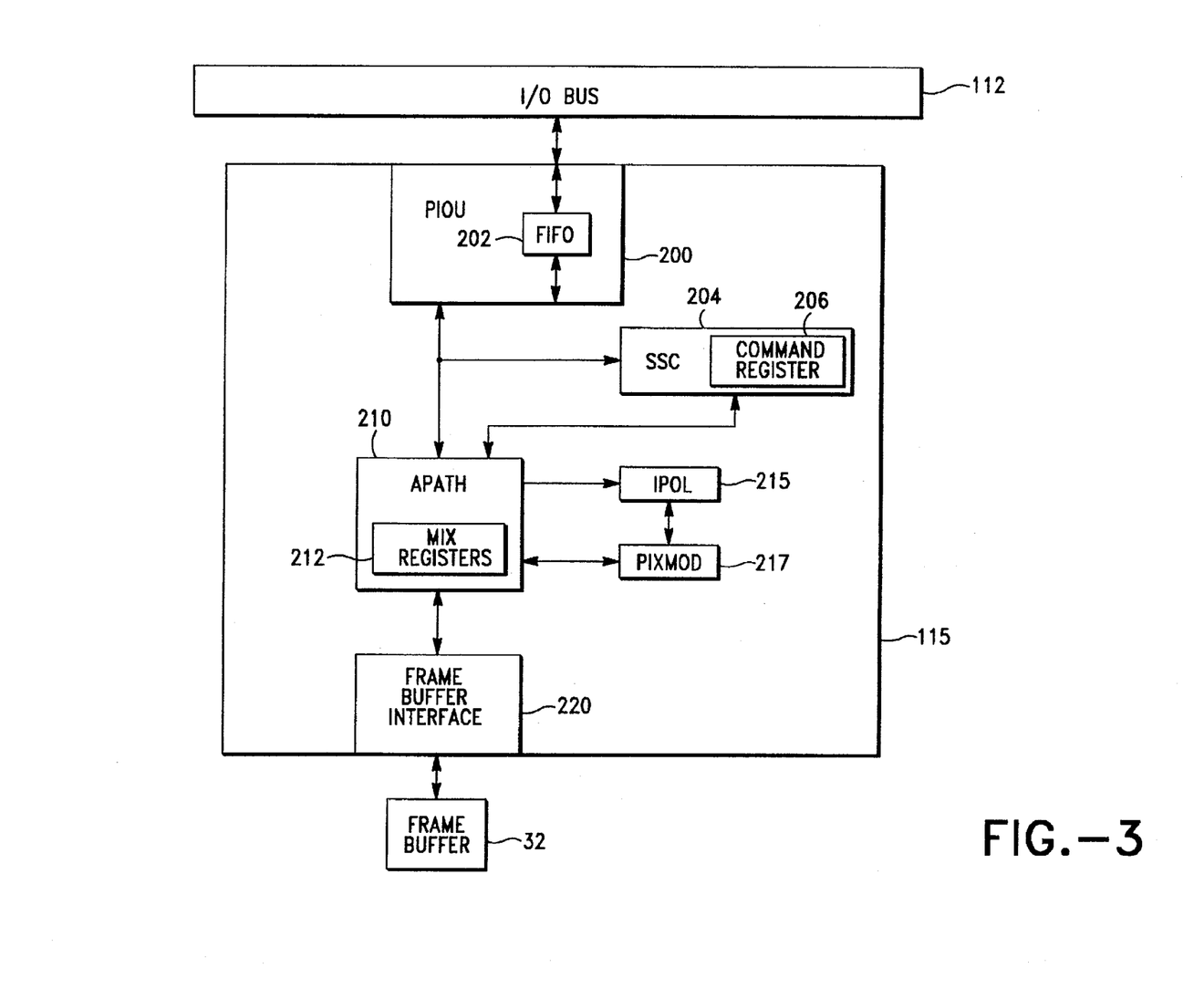
FIG. 3 schematically illustrates the internal components of the rendering processor of the present invention.

The internal organization of a preferred embodiment of processor 115 is shown in FIG. 3. A pixel input/output unit (PIOU) functional block 200 provides the processor interface, allowing CPU 15 to pass data and commands to processor 115, to read and write registers, to read pixel data from frame buffer 32, and to write pixel data to frame buffer 32. PIOU 200 preferably includes multiple first-in first-out (FIFO) modules (collectively indicated by reference numeral 202) that facilitate slave-mode co-scanning, as described below.

PIOU 200 communicates with a scanning engine (SSC) block 204, which performs primitive scan conversion of graphics primitives. SSC 204 contains a data register 206 for receiving primitives and commands corresponding to functions to be performed on the primitives. Both PIOU 200 and SSC 204 communicate with a control block (APATH) 210, which controls the fetching, buffering and storing of framebuffer data. Preferably, APATH 200 is heavily pipelined and prefetches data about to be operated upon, buffers data after it is fetched, created or modified, and stores data for writing into frame buffer 32. APATH 210 contains a plurality of registers 212 including a series of command registers whose identities are associated with command functions, so that writing of values into these registers results in ordered execution of the associated function.

APATH 210 sends raw pixel data to an interpolation (IPOL) block 215, which interpolates the color (r,g,b), α, F and z values for each drawn pixel. IPOL 215 passes interpolated values to a modification (PIXMOD) block 217, which performs pixel modification operations such as logic operations, alpha blending, texture filtering and blending, and plane masking in response to commands issued by IPOL 215. PIXMOD 217 returns processed values to APATH 210. Data traffic to and from frame buffer 32 is handled by a frame buffer interface 220, which performs the actual framebuffer read and write operations and refreshes the framebuffer memories. Not shown in the figure are such staple interface components as connections to an input/output system (e.g., BIOS) ROM chip and related on-board devices, a display controller for generating screen timing (blank and sync) for the system, and video (e.g., NTSC capture) functionality.

SSC 204 preferably recognizes a standard set of two- and three-dimensional primitives and performs various utility functions associated therewith. In a representative embodiment, the utility functions are actuable by commands issued by CPU 15 and include passing of register contents to I/O bus 112 via FIFO 202, buffer operations, and mode settings. Primitive operations include bit-block transfers ("BitBits"), which combine data from one or more screen-aligned rectangular source areas of frame buffer 32 to a screen-aligned destination area of the frame buffer; fill operations, which fill a screen-aligned polygon with a fixed color value; rectangular window clipping, using data stored in clipping boundary registers contained in SSC 204; patterning raster operations, such as tiling a pattern established by a designated series of pixels into a defined, bounded area; "stretching" and "shrinking" of defined source pixel blocks; drawing of Bresenham lines; and drawing of three-dimensional primitives including points, lines, spans, and filled areas.

Rendering processor 115 is configured to permit synchronous control of SSC 204, APATH 210, IPOL 215 and PIXMOD 217 by an external processor, such as CPU 15, lighter processor 117 or texture processor 111. In this mode, rendering processor 115 is "slaved" to the timing of the controlling external processor element, single-stepping through the scan-conversion process. This "slave-mode co-scanning" capability is particularly useful in the context of texture-mapping operations, in that scan conversion can be keyed to performance, by texture processor 111 (or CPU 15), of the required texture-mapping computations. In addition, slave-mode operation derives particular benefit from self-actuating command registers.

Slave-mode operation facilitates an optimal division of processing responsibilities among different processor elements; instead of equipping rendering processor 115 with expensive texture-processing hardware, or assigning all rendering tasks to relatively slow, high-overhead software, these tasks are dispersed in a manner that recognizes the performance characteristics of the various system components. Preferably, CPU 15 (or processor 117 or 111) generates primitives by decomposing elements to be drawn into draw or no-draw steps; CPU 15, geometry processor 117 or texture processor 111 performs texture-mapping computations as well as some of the scan-conversion computations, the results of which are provided to various ones of registers 212 to cause execution of one of the supported operations (as described below). Rendering processor 115, in turn, transforms the primitives into pixel locations, performs pixel-by-pixel scan conversion as described above, performs any designated texture filtering and blending operations on the pixels and writes the results into frame buffer 32. These operations take place synchronously among components, so that rendering processor utilizes the results of externally performed computations as soon as possible after they are available, during which time the external components remain free to perform subsequent computations.

To draw a primitive, the external processor element loads the required parameters and the slave-mode command representing the designated primitive. The external processor element then loads, for the first pixel, a series of texture command/data pairs into the appropriate self-actuating registers 212; loading a word of data into these register addresses initiates the corresponding processor operations. The data represents a texel address or a scale factor needed for texture filtering (i.e., the fractional component of u, v or d required for mip map linear interpolation). After the texture commands have been completed for the first pixel, the SlaveStep command is entered, readying processor 115 to operate on the next pixel.

Rendering processor 115 preferably executes the following slave step commands:

SlaveStepPX: Step right
SlaveStepNX: Step left
SlaveStepPY: Step down
SlaveDrawStepPX: Draw current pixel, then step right
SlaveDrawStepNX: Draw current pixel, then step left
SlaveDrawStepPY: Draw current pixel, then step down
SlaveReturnStepPX: Return to saved pixel location, then step right
SlaveReturnStepNX: Return to saved pixel location, then step left
SlaveDrawReturnStepPX: Draw current pixel, then return to saved pixel location, then stepright
SlaveDrawReturnStepNX: Draw current pixel, then return to saved pixel location, then stepleft
SlaveSaveStepPX: Save current pixel location, then step right
SlaveSaveStepNX: Save current pixel location, then step left
SlaveDrawSaveStepPX: Draw current pixel location, then save current pixel location, then step right
SlaveDrawSaveStepNX: Draw current pixel location, then save current pixel location, then step left
DrawLineMajorStep: Draw current line pixel, then take a major step
DrawLineMinorStep: Draw current line pixel, then take a minor step Recognized texel commands, each associated with a unique, self-actuating register 212, are preferably directed toward identification of texel addresses, linear interpolation among and within mip maps, and point sampling. Linear interpolation and point sampling operations include interpolation among mip maps (using the d factor) or selection of the nearest map, and interpolation within a map (i.e., among up to four texels that surround the u,v coordinate computed for a given pixel), or identification of the nearest texel within a selected map. In particular, the texel commands supported by the present invention preferably fall into four categories: NEAREST operations that identify the nearest texel in a single map; LINEAR operations that interpolate between the nearest texels of a single map; NEARESTMIPMAP NEAREST point-sampling operations that identify the nearest mip map (using the d value) and the nearest texel therein; NEARESTMIPMAPNEAREST operations that perform linear interpolation among four texels within the nearest mip map; NEARESTMIPMAPNEAREST operations that select the nearest texels from two surrounding maps and linearly interpolate between them; and LINEARMIPMAPLINEAR commands that interpolate among mip maps and texels.

Although it is possible to simply associate each possible command with a single self-actuating register, the fact that some commands represent combinations of lower-level commands and require characteristic amounts of data facilitates reduction in the overall number of registers. In the preferred embodiment, the following commands are associated with individual, dedicated registers:

| Command | | Function |
|---|---|---|
| TexCommand0 | Acc3 = | Fetch_Texel(Input Data) |
| TexCommand1 | TMP = | Fetch_Texel(Input Data) |
| TexCommand2 | Acc1 = | TMP*(1−uf) + Fetch_Texel(Input Data)*uf |
| TexCommand3 | Acc2 = | TMP*(1−uf) + Fetch_Texel(Input Data)*uf |
| TexCommand4 | Acc3 = | Acc1*(1−vf) + Acc2*vf |
| TexCommand5 | Acc3 = | TMP*(1−df) + Fetch_Texel(Input Data)*df |
| TexCommand6 | Acc1 = | Acc1*(1−vf) + Acc2*vf |
| TexCommand7 | Acc3 = | Acc1*(1−df) + Acc3*df |
| TexCommand8–13 | (Internal use) | |
| TexCommand14 | load df | |
| TexCommand15 | load uf | | where TMP, Acc1, Acc2 and Acc3 are temporary registers; uf, vf and df are registers that are loaded with the fractional values of u, v and d values in TexCommands 2–7, 14 and 15; and FetchTexel(Input Data) refers to color data (e.g., r, g, b and α) associated with a fetched texel.

An operation is performed by loading data into the register or series of registers individually or collectively corresponding to the operation. The operations and their associate command registers are as follows:

| | |
|---|---|
| NEAREST | |
| TexCommand0 | Texel address 1 |
| LINEAR | |
| TexCommand1 | Texel address 1 |
| TexCommand15 | (u) fraction (first mip map) |
| TexCommand2 | Texel address 2 |
| TexCommand1 | Texel address 3 |
| TexCommand3 | Texel address 4 |
| TexCommand4 | (v) fraction (first mip map) |
| NEAREST MIPMAP NEAREST | |
| TexCommand0 | Texel address 1 |
| LINEAR MIPMAP NEAREST | |
| TexCommand1 | Texel address 1 |
| TexCommand15 | (u) fraction (first mip map) |
| TexCommand2 | Texel address 2 |
| TexCommand1 | Texel address 3 |
| TexCommand3 | Texel address 4 |
| TexCommand4 | (v) fraction (first mip map) |
| NEAREST MIPMAP LINEAR | |
| TexCommand1 | Texel address 1 |
| TexCommand14 | (d) fraction (between mip maps) |
| TexCommand5 | Texel address 2 |
| LINEAR MIPMAP LINEAR | |
| TexCommand1 | Texel address 1 |
| TexCommand15 | (u) fraction (first mip map) |
| TexCommand2 | Texel address 2 |
| TexCommand1 | Texel address 3 |
| TexCommand3 | Texel address 4 |
| TexCommand4 | (v) fraction (first mip map) |
| TexCommand1 | Texel address 5 |
| TexCommand15 | (u) fraction (second mip map) |
| TexCommand2 | Texel address 6 |
| TexCommand1 | Texel address 7 |
| TexCommand3 | Texel address 8 |
| TexCommand6 | (v) fraction (second mip map) |
| TexCommand7 | (d) fraction (between mip maps) |

Figure 4:
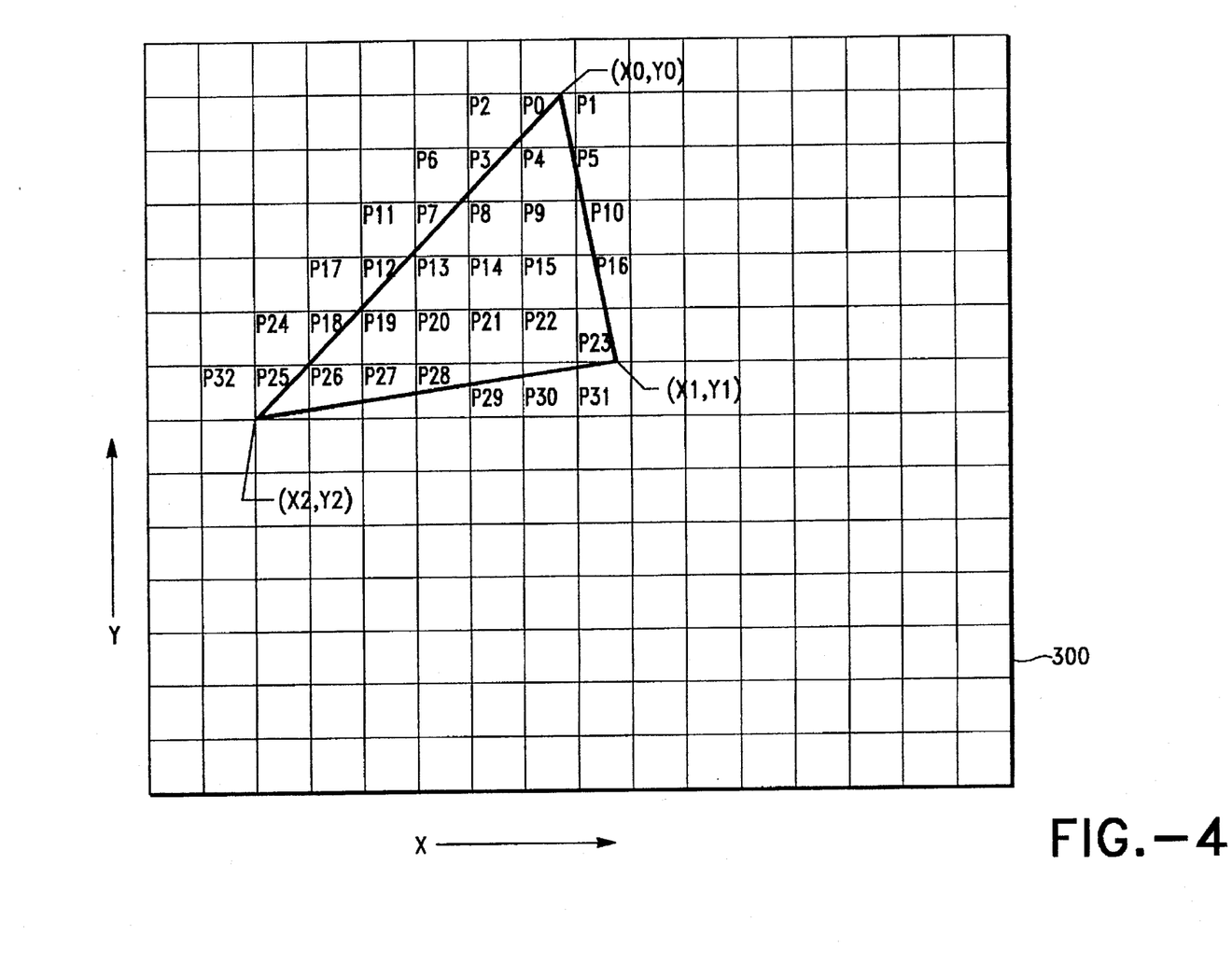
FIG. 4 depicts the manner in which a representative triangle may be scan-converted in "slave mode."

Operation of this aspect of the invention is most readily appreciated in the context of a specific example. FIG. 4 depicts the manner in which rendering processor 115 scan-converts a three-dimensional, textured triangle in slave mode. The external processor element—i.e., CPU 15, processor 117 and/or processor 111—performs the following steps:

1. Load the initialization values for the triangle into SSC 204.
2. Load the command to draw a fill primitive into register 206.
3. Compute and load the addresses of the texel(s) corresponding to the first pixel and texel commands associated therewith.
4. Compute the next pixel to scan.
5. Load the appropriate slave-mode step command into SSC 204.
6. Repeat steps 3–5 for each pixel in the primitive.
7. Terminate when scanning is complete.

The overall sequence of operation executed by rendering processor 115 is as follows:

1. Perform any necessary internal initialization when the fill-primitive command is received.
2. Perform the required texel fetching and texel computations in response to the texel commands.
3. Compute pixel addresses, fetch destination pixel (if one already exists and must be combined in some fashion with the pixel to be computed) and z (if Z-buffering is employed), combine destination pixel (and z) with filtered texel (and interpolated z) resulting from step 2, and write the modified destination pixel to frame buffer 32 (or other destination pixmap).
4. Interpolate z, r, g, b, $\alpha$, F values when stepping.
5. Perform the foregoing steps in the exact order received or, if out of order, handle any required sequencing to produce the same result.

Additional image generation and manipulation functionality can also be incorporated into rendering processor 115. For example, modules capable of filtering operations such as antialiasing and dithering, alpha operations such as alpha blending and thresholding, Z-buffering, fog computations, clipping, double-buffering, and texel-to-pixel format conversions (e.g., conversion of 32-bit texels to 16-bit r,g,b pixel format). Suitable firmware, logic and register organizations for performing these functions are well-characterized in the digital-rendering art, enabling straightforward construction of appropriate functional blocks for inclusion in processor 115. These blocks are integrated in a pipelined fashion with IPOL 215 and PIXMOD 217 such that slave-mode scanning results in synchronous provision of pixel data that is processed sequentially through the various functional blocks.

With reference to FIG. 4, the grid 300 represents a portion of frame buffer 115. The illustrated triangle is a primitive recognized by CPU 15, and which must be scan-converted by rendering processor 115 into a series of turned-on, properly valued pixels in frame buffer 32. CPU 15 initializes rendering processor 115, scans the illustrated triangle, communicating to processor 115 the coordinate locations of the segments (X0,Y0),(X1,Y1); (X1,Y1),(X2,Y2); and (X2,Y2) ,(X0,Y0). CPU 15 also gives step commands and texel commands to processor 115. Processor 115 performs rendering (i.e., writing of pixel values into frame buffer 32), stepping through the pixel locations in grid 300 that are intercepted by segments of or fall within the primitive according to the step commands discussed above. Ordinarily, this is accomplished by stepping the in the+or–X direction or the+Y direction in accordance, for example, with a Pinada scanning algorithm (see, e.g., ACM SIGGRAPH Proc.—Comp. Graphics, vol. 22, No. 4 [Aug. 1988]at 17–20). Other scanning algorithms, such as scan-line-based approaches, can also be used to advantage.

Using the Pinada approach, and using the convention of stepping right after stepping down, the triangle is scan-converted and filled as shown in FIG. 4; relevant pixel locations are denoted by numerals preceded by the letter P. The pixel holding the topmost coordinate (P0) is the first pixel scanned; the next pixel is the one to the right of P0. When scanning passes beyond the right edge of the triangle, the process jumps back to the pixel to the left of P0 and proceeds until the leftmost edge of the triangle is scanned. At this point, the scanning process steps down to the next scan line. As scanning proceeds, the current state of the registers is sequentially saved to allow returning. For example, when the scanning process steps down, the values at the first pixel scanned in the new scan line are saved to enable return to the pixel left of the first pixel after scanning to the right has been completed for that line.

Rendering processor 115 draws pixels only in response to slave commands that include the word "Draw," saves its state only in response to slave commands that include the word "Save," and returns only if the command includes the word "Return." Processor 115 steps in the positive X direction (i.e., to the right in FIG. 4) in response to commands that include "Step PX," steps in the negative X direction in response to commands that include "Step NX," and steps in the positive Y direction in response to commands that include "Step PY." In the scan-conversion process, rendering processor 115 determines the extent to which an intercepted pixel lies within the segments defining the primitive. Ordinarily, a pixel is actually drawn only if it lies mostly within the primitive bounds; however, if antialiasing or another filter operation is applied, the pixel may be drawn (or drawn with partial coverage) as dictated by the filter.

The following sequence of slave-mode commands will cause processor 115 to render the triangle shown in FIG. 4. For purposes of this example, it is assumed that a pixel is not drawn unless its center point is within the triangle boundaries. Furthermore, texel commands are not set forth, it being understood that CPU 15 or other external processing element sends an appropriate set of such commands to rendering processor 115 before each slave step following the first and before the SlaveEnd step; rendering processor 115 utilizes the texel commands to generate the filtered texel value stored in each of the memory locations corresponding to a drawn pixel.

1. Slave3DFill (Initialize rendering processor 115)
2. SlaveDrawSaveStepPX (Draw P0, then step 1 pixel in the+X direction)
3. SlaveReturnStepNX (do not draw P1 since it is outside triangle; return to P2)
4. SlaveStepPY (do not draw P2 since it is outside triangle)
5. SlaveDrawSaveStepPX (draw P3, save state, then step in the+X direction)
6. SlaveDrawStepPX (draw P4 and step+X)
7. SlaveReturnStepNX (don't draw P5, move to P6)
8. SlaveStepPY
9. SlaveDrawSaveStepPX (draw P7)
10. SlaveDrawStepPX (draw P8)
11. SlaveDrawStepPX (draw P9)
12. SlaveReturnStepNX
13. SlaveStepPY
14. SlaveDrawSaveStepPX (draw P12)
15. SlaveDrawStepPX (draw P13)
16. SlaveDrawStepPX (draw P14)
17. SlaveDrawStepPX (draw P15)
18. SlaveDrawReturnStepNX (draw P16)
19. SlaveStepPY 20. SlaveDrawSaveStepPX (draw P18)
21. SlaveDrawStepPX (draw P19)
22. SlaveDrawStepPX (draw P20)
23. SlaveDrawStepPX (draw P21)
24. SlaveDrawStepPX (draw P22)
25. SlaveDrawReturnStepNX (draw P23)
26. SlaveStepPY
27. SlaveDrawSaveStepPX (draw P25)
28. SlaveDrawStepPX (draw P26)
29. SlaveDrawStepPX (draw P27)
30. SlaveDrawStepPX (draw P28)
31. SlaveReturnStepNX (don't draw P29 since pixel center is outside triangle)
32. SlaveEnd (P32 is outside and stepping down leads below bottom edge of triangle)

It will therefore be seen that the foregoing represents a highly advantageous approach to blending hardware and software pixel-writing capabilities to optimize cost and efficiency. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for processing and facilitating display of images stored as pixmaps, the apparatus comprising:
   a. a central processing unit (CPU);
   b. a system memory including stored instructions for operating the CPU;
   c. a frame buffer for storing a pixmap comprising displayable pixel data;
   d. a rendering processor operatively connected to the frame buffer and responsive to commands issued by the CPU, for scan-converting primitives into pixel data and storing the data in the frame buffer;
   e. a CPU-memory bus for facilitating data exchange between the CPU and (i) the system memory, and (ii) at least one mass storage device; and
   f. an I/O bus for facilitating data exchange between the CPU and the rendering processor,
   the CPU operating in accordance with instructions fetched from the system memory over the CPU-memory bus to generate output primitives and texel commands, and to transfer the primitives and texel commands over the I/O bus to the rendering processor; and the rendering processor being configured to generate pixel memory addresses, refine pixel data by linear interpolation, and execute the texel commands, and
   the rendering processor including means for implicitly specifying execution of operations associated with the primitives in response to loading of primitives into the implicitly specifying means, wherein the implicitly specifying means comprises a plurality of self-actuating registers, each associated with an operation and independently addressable by the CPU, for receiving data from the I/O bus and, upon such receipt, causing the rendering processor to perform the associated operation on the data.

2. The apparatus of claim 1 wherein the rendering processor further comprises means for generating display timing.

3. The apparatus of claim 1 wherein the rendering processor is isolated from system memory and the CPU is isolated from the frame buffer.

4. The apparatus of claim 3 further comprising means for facilitating texture mapping, said means including:
   a. means for accessing a texture map comprising an array of texels each comprising texel data;
   b. means for identifying, with respect to each pixel for which data is stored in the frame buffer, at least one texel associated therewith; and
   c. means for combining, for each pixel, the pixel data with texel data from the at least one associated texel to produce blended data for storage in the frame buffer.

5. The apparatus of claim 4 wherein the rendering processor comprises means responsive to commands issued by the CPU for interpolating among a plurality texel maps.

6. The apparatus of claim 1 wherein the rendering processor comprises a pluraliity of registers each accessible to the CPU over the I/O bus, each register corresponding to a rendering comand such that loading of data into the register causes the rendering processor to execute the corresponding command on the loaded data.

7. The apparatus of claim 5 wherein the rendering processor comprises a pluraliity of registers each accessible to the CPU over the I/O bus, each register corresponding to a texel-processing comand such that loading of data into the register causes the rendering processor to execute the corresponding command on the loaded data, the texel-processing commands including (i) fetching of a texel having a memory address identified by the loaded data, and (ii) linear interpolation among mip maps.

8. The apparatus of claim 7 further comprising means associated with the rendering processor for facilitating synchronous pipelined operation between the CPU and the rendering processor, the CPU executing stored instructions coincident with scan conversion of the primitives by the rendering processor.

9. The apparatus of claim 8 wherein the stored instructions define computationally intensive operations on the primitives and the rendering processor further comprises means for refining pixel data coincident with execution by the CPU of stored instructions.

10. The apparatus of claim 9 wherein the rendering processor refines pixel data by operations including linear interpolation, filtering, clipping, alpha blending and computation of fog value.

11. Apparatus for processing and facilitating display of images on a screen of a system having an external processor configured to perform computationally intensive image-generation operations resulting in generation of primitives, the apparatus comprising:
   a. a frame buffer for storing pixmaps, each pixmap comprising pixel data displayable as images on the screen; and
   b. a rendering processor exclusively coupled between the external processor and the frame buffer, and responsive to the primitives generated by the external processor, for scan-converting the primitives into pixel data for display on the screen, the rendering processor including means for implicitly specifying execution of operations associated with the primitives in response to loading of primitives into the implicitly specifying means, wherein the implicitly specifying means comprises a plurality of self-actuating registers, each associated with an operation and independently addressable by the external processor, for receiving data from the external processor and, upon such receipt, causing the rendering processor to perform the associated operation on the data.

12. The apparatus of claim 11 further comprising a system bus for transferring the primitives from the external processor to the rendering processor.

13. The apparatus of claim 11 wherein the self-actuating registers obviates transfer of texture-mapping commands from the external processor to the rendering processor.

14. The apparatus of claim 11 wherein the external processor comprises means for synchronously controlling the rendering processor to discretely execute each texture-mapping operation associated with the self-actuating registers to thereby optimize throughput of the system bus.

15. The apparatus of claim 14 wherein the external processor is one of a geometric processing element and a central processing unit.

16. In a multiple-processor computer system comprising a first processor and a second processor operatively coupled thereto and configured to process data from the first processor, a command facility associated with the second processor comprising:

a. an interface for receiving data from the first processor;

b. execution means for selectably performing operations on the received data;

c. a plurality of self-actuating data registers, each associated with an operation and independently addressable by the first processor, for receiving data from the interface and, upon such receipt, causing the execution means to perform the associated operation on the data.

17. The facility of claim 16 wherein the first processor is an external processor;and the second processor is a rendering processor, the system further comprising a frame buffer, operatively coupled to the rendering processor, for receiving processed data from the rendering processor and determining the instantaneous appearance of a screen display, the selectable operations comprising pixel-processing operations and the processed data representing displayable pixel values.

18. The facility of claim 17 wherein the system further comprises means for storing at least one mip map comprising an array of texels, each texel having an associated value, the rendering processor having access to storage means, and the selectable operations including identification of a stored mip map, identification of a texel in an identified mip map having a value nearest to that of a pixel value, and interpolation among texels in an identified mip map.

19. The facility of claim 18 comprising means for storing a plurality of mip maps, the selectable operations further including selection of a mip map and interpolation among mip maps.

* * * * *